United States Patent [19]

Duck et al.

[11] 3,873,826

[45] Mar. 25, 1975

[54] PHOTOELECTRIC METHODS AND APPARATUS WITH CONTRAST ENHANCEMENT

[75] Inventors: Sherman W. Duck, Glenview, Ill.; Frederick J. Jeffers, Altadena, Calif.

[73] Assignee: Bell & Howell Company, Chicago, Ill.

[22] Filed: Dec. 29, 1972

[21] Appl. No.: 319,261

[52] U.S. Cl. .......... 250/200, 250/211 R, 250/214 P

[51] Int. Cl. ............. G01j, H01j 39/00, H01j 39/12

[58] Field of Search ............ 250/214 P, 211 R, 200; 356/71

[56] References Cited

UNITED STATES PATENTS 3,379,527 4/1968 Corrsin et al. .................. 250/211 R 3,704,949 12/1972 Thomas ................................ 356/71

*Primary Examiner*—Archie R. Borchelt

*Assistant Examiner*—T. N. Grigsby

*Attorney, Agent, or Firm*—Benoit Law Corporation

[57] ABSTRACT

Response contrast of photoelectric processes is enhanced by selecting photoelectric systems having different rise times for different light input intensities, and by exposing the photoelectric systems during periods of time which are shorter than the rise time for a lower light intensity or which are at least as short as the rise time for a higher light intensity. Bright spot detection systems and magnetic imaging or recording systems employing these rise time phenomena are also disclosed.

16 Claims, 5 Drawing Figures

PHOTOELECTRIC METHODS AND APPARATUS WITH CONTRAST ENHANCEMENT

BACKGROUND OF THE INVENTION

1. Field of the Invention

The subject invention relates to photoelectric systems, including holographic identification systems, bright spot detection systems, and magnetic recording or imaging systems, including so-called "Curie point recording or imaging systems."

2. Description of the Prior Art

In recent years systems have become known in which images or other patterns are identified or located with the aid of a hologram of the particular image or pattern. Typical representatives of this art are disclosed in the U.S. Pat. Nos. 3,532,426 and 3,539,260 and in reference cited therein.

According to the latter disclosures, coherent light, such as laser light, is employed in a known manner to generate holograms of a series of image patterns. To locate or identify any of these image patterns, the generated holograms are thereafter successively employed as spatial filters for coherent light images of the pattern to be identified or located.

In this latter type of system, a relatively bright light impulse or spot will indicate correspondence between the image pattern and its holographic counterpart. This bright spot is visually apparent against the lighted background in which it occurs.

In practice, however, difficulties are encountered if an automated readout is desired, since prior-art readout equipment typically cannot accurately distinguish between a bright spot in a lighted background and a somewhat enhanced intensity of the lighted background without a bright spot. A photocell, for instance, will integrate light intensities over its active surface and will thus not reliably distinguish between an illumination of a given overall intensity and an illumination of a somewhat lower intensity having a bright spot located therein.

Similar problems occur in other fields of technology, such as in the area of photographic exposure metering where a bright spot in a scene can lead to overall underexposure that cannot be prophylactically detected by conventional exposure meters.

Related problems occur in photoelectric processes in which the preservation of a distinction between different spatially distributed light intensities is important. For instance, typical photoconductive materials used in certain photoelectric imaging processes do not permit preservation of the contrast between input light stimuli.

By way of example, and not by way of limitation, reference is in this connection made to a magnetic imaging process which employs a photoelectric system to provide a pattern of electric currents corresponding to light intensities of an input image, and which utilizes these electric currents to heat a magnetic recording medium in order to provide a magnetic pattern representing the input image by operation of a thermomagnetic effect. Typical photoconductive materials used in this type of imaging process display an electrical conductivity which is related to the input illumination by a 0.8 to 0.6 power law dependence. This, in turn, results in a decreased contrast in the magnetic record or printout of the input image.

SUMMARY OF THE INVENTION

It is broadly an object of this invention to overcome the above mentioned disadvantages.

It is a more specific object of this invention to provide methods and apparatus for enhancing contrast of response of photoelectric processes to light stimuli of different intensities.

It is a further object of this invention to provide methods and apparatus for detecting a bright spot in an illuminated background.

It is a related object of this invention to provide improved searching or locating systems utilizing the detection of a bright spot in an illuminated background.

It is also an object of this invention to provide enhanced contrast of response in thermographic, thermomagnetic and other imaging or recording systems.

It is a related object of this invention to provide improved thermographic, thermomagnetic and other imaging or recording systems.

These and other objects will become more fully apparent in the further course of this disclosure.

The expression photoelectric is herein employed in a broad and generic sense so as to include photoconductive systems and materials.

From a first aspect thereof, this invention resides in a method of enhancing contrast of response of a photoelectric process to first and second light stimuli having first and second light intensities, respectively, with said first light intensity being higher than said second light intensity. The invention according to this aspect resides, more specifically, in the improvement comprising in combination the steps of providing a photoelectric system having a first rise time in response to that first intensity and a second rise time in response to said second intensity, said first rise time being shorter than said second rise time, exposing the photoelectric system to the first and second stimuli for a period of time shorter than the second rise time, and deriving an electric signal from the photoelectric system during said period of time.

From another aspect thereof, the invention resides in a method of detecting a bright spot in an illuminated background, and resides, more specifically, in the improvement comprising in combination the steps of providing a photoelectric system having a first rise time in response to said bright spot and a second rise time in response to the illuminated background, said first rise time being shorter than said second rise time, exposing the photoelectric system to said bright spot and to the illuminated background for a period of time shorter than the second rise time, and deriving an electric signal indicative of the bright spot from the photoelectric system.

From a further aspect thereof, the invention resides in a method of enhancing contrast of response of a photoelectric process to spatially distributed first and second light stimuli having first and second light intensities, respectively, with said first light intensity being higher than said second light intensity. The invention according to this aspect resides, more specifically, in the improvement comprising in combination the steps of providing a photoelectric system having a first rise time in response to the first intensity and a second rise time in response to the second intensity, said first rise time being shorter than said second rise time, exposing the photoelectric system to said spatially distributed first and second stimuli for a first period of time shorter than the second rise time, and generating with the photoelectric system during said first period of time a pattern of spatially distributed electrical currents having first and second current intensities in response to said first and second light intensities, with the contrast between the first and second current intensities being enhanced relative to a contrast attainable by an exposure of the photoelectric system to the spatially distributed first and second intensities for a second period of time longer than said first period of time.

From another aspect thereof, the invention resides in apparatus for providing enhanced contrast of response to first and second light stimuli having first and second light intensities, respectively, with said first light intensity being higher than said second light intensity. The invention according to this aspect resides, more specifically, in the improvement comprising, in combination, a photoelectric system having a first rise time in response to said first intensity and a second rise time in response to said second intensity, said first rise time being shorter than said second rise time, means for exposing the photoelectric system to the first and second stimuli for a period of time shorter than said second rise time, and means connected to the photoelectric system for deriving an electric signal from the photoelectric system during said period of time.

From another aspect thereof, this invention resides in apparatus for detecting a bright spot in an illuminated background, and resides, more specifically, in the improvement comprising, in combination, a photoelectric system having a first rise time in response to said bright spot and a second rise time in response to the illuminated background, said first rise time being shorter than said second rise time, means for exposing the photoelectric system to said bright spot and to the illuminated background for a period of time shorter than said second rise time, and means connected to the photoelectric system for deriving an electric signal indicative of said bright spot from the photoelectric system.

From yet another aspect thereof, this invention resides in apparatus for providing a pattern of spatially distributed currents in response to spatially distributed first and second light stimuli having first and second light intensities, respectively, with said first light intensity being higher than said second light intensity. The invention according to this aspect resides, more specifically, in the improvement comprising, in combination, a photoelectric system having a first rise time in response to the first intensity and a second rise time in response to the second intensity, the first rise time being shorter than the second rise time, means for exposing the photoelectric system to the spatially distributed first and second stimuli for a first period of time shorter than the second rise time, and means connected to the photoelectric system for generation during said first period of time a pattern of spatially distributed electrical currents having first and second current intensities in response to the first and second light intensities, whereby the contrast between the first and second current intensities is enhanced relative to a contrast attainable by an exposure of the photoelectric system to the spatially distributed first and second intensities for a second period of time longer than the first period of time.

From a further aspect thereof, the invention resides in apparatus for providing a magnetic record of spatially distributed first and second light stimuli having first and second light intensities, respectively, with said first light intensity being higher than said second light intensity. The invention according to this aspect resides, more specifically, in the improvement comprising, in combination, a photoelectric system having a first rise time in response to the first intensity and a second rise time in response to the second intensity, said first rise time being shorter than said second rise time, means for exposing the photoelectric system to the spatially distributed first and second stimuli for a period of time shorter than said second rise time, means connected to the photoelectric system for generating during the first period of time a pattern of spatially distributed electrical currents having first and second current intensities in response to the first and second light intensities, means for providing with the aid of the electrical currents a pattern of thermal gradients having first and second thermal intensities corresponding to the first and second current intensities, and means for providing with the aid of said thermal gradients, and for retaining, a pattern of erasable magnetic gradients having first and second intensities corresponding to said first and second thermal intensities.

The essential provision according to the subject invention concerning exposure for a defined period of time which is either shorter than the defined second rise time or, in accordance with a preferred embodiment of the subject invention, at least as short as the defined first rise time, applies not only in cases in which the entire photoelectric system is exposed at once, but also in situations in which successive portions of the photoelectric system are exposed. In the latter case, the exposure of each portion of the photoelectric system is limited to a period of time being shorter than the defined second rise time or being at least as short as the defined first rise time. The term exposure then refers not to the sum total of the exposure steps of successive portions of the photoelectric system, but rather to the exposure of each of several successively exposed portions of the photoelectric system.

Accordingly, the subject invention also resides in a method of enhancing contrast of response of a photoelectric process to spatially distributed first and second light stimuli having first and second light intensities, respectively, with said first light intensity being higher than said second light intensity. The invention according to this aspect resides, more specifically, in the improvement comprising, in combination, the steps of providing a photoelectric system having a first rise time in response to the first intensity and a second rise time in response to the second intensity, said first rise time being shorter than said second rise time, exposing successive portions of the photoelectric system to the spatially distributed first and second stimuli, each portion of the photoelectric system so exposed being exposed for a first period of time shorter than the second rise time, and generating with the photoelectric system a pattern of spatially distributed electrical currents having first and second current intensities in response to the first and second light intensities, with the contrast between the first and second current intensities being enhanced relative to a contrast attainable by an exposure of portions of said photoelectric system to the spatially distributed first and second intensities for a second period of time longer than said first period of time.

From a related aspect thereof, this invention resides in apparatus for providing a pattern of spatially distributed currents in response to spatially distributed first and second light stimuli having first and second light intensities, respectively, with said first light intensity being higher than said second light intensity. The invention according to this aspect resides, more specifically, in the improvement comprising, in combination, a photoelectric system having a first rise time in response to the first intensity and a second rise time in response to the second intensity, said first rise time being shorter than said second rise time, means for exposing successive portions of the photoelectric system to the spatially distributed first and second stimuli, including means for limiting the exposure of each of the portions of the photoelectric system to a first period of time shorter than said second rise time, and means connected to the photoelectric system for generating during said first period of time a pattern of spatially distributed electrical currents having first and second current intensities in response to the first and second light intensities, whereby the contrast between the first and second current intensities is enhanced relative to a contrast attainable by an exposure of the photoelectric system to the spatially distributed first and second intensities for a second period of time longer than said first period of time.

In accordance with a preferred embodiment of the subject invention, all of the above mentioned methods may be modified by making the period of time of exposure of the photoelectric system at least as short as the defined first rise time. Similarly, and in accordance with a preferred embodiment of the subject invention, the above mentioned exposing means of all of the apparatus defined above may include means for exposing the photoelectric system, or for exposing any portion of the photoelectric system, to the first and second stimuli, or to the above mentioned bright spot and illuminated background, for a period of time being at least as short as the defined first rise time. As will become apparent in the further course of this disclosure, this still further enhances the contrast of response of the methods and apparatus herein disclosed.

The concept of rise time is well known and frequently used in the photoelectric field and may be defined as the time it takes for the electric current in the photoelectric system to reach a value equal to $(1-1/e)\, I_{inf.}$, wherein $e$ is the base of the system of natural logarithms, and $I_{inf.}$ is the long term electric current.

BRIEF DESCRIPTION OF THE DRAWINGS

The subject invention and its various aspects will become more readily apparent from the following detailed description of preferred embodiments of the invention, illustrated by way of example in the accompanying drawings, in which like reference numerals designate like or functionally equivalent parts, and in which.

DESCRIPTION OF PREFERRED EMBODIMENTS

Figure 1:
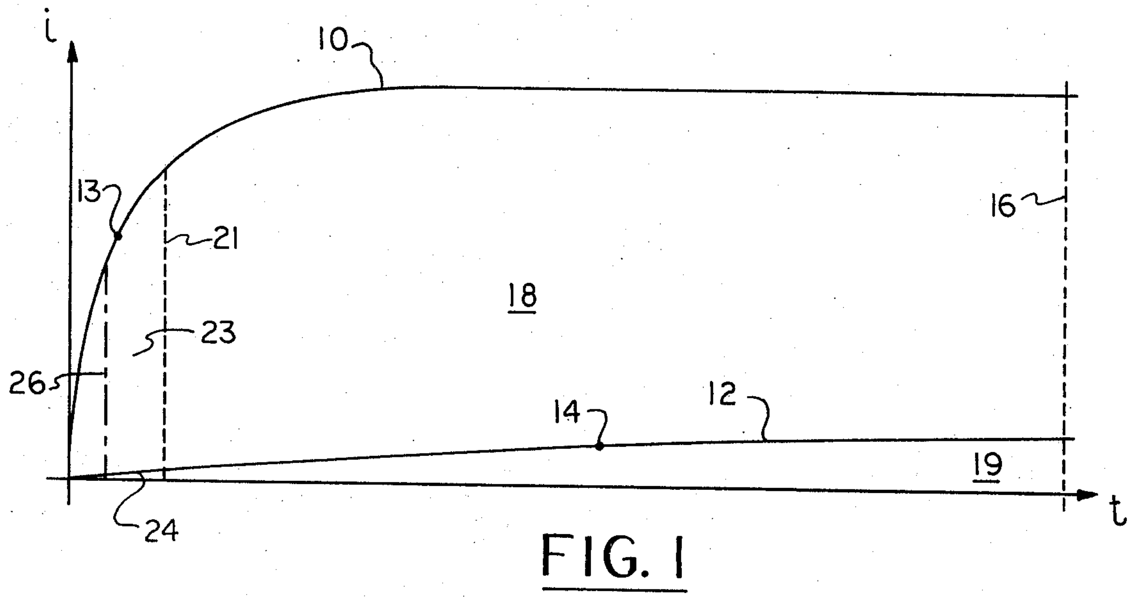
FIGS. 1 and 2 are graphs illustrating the principle, and illustrating the operation of preferred embodiments, of the subject invention.
Figure 5:
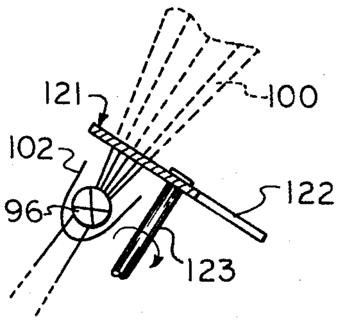
FIG. 5 is a diagrammatic illustration of a modification of the system of FIG. 4, in accordance with yet another preferred embodiment of the subject invention.
Figure 3:
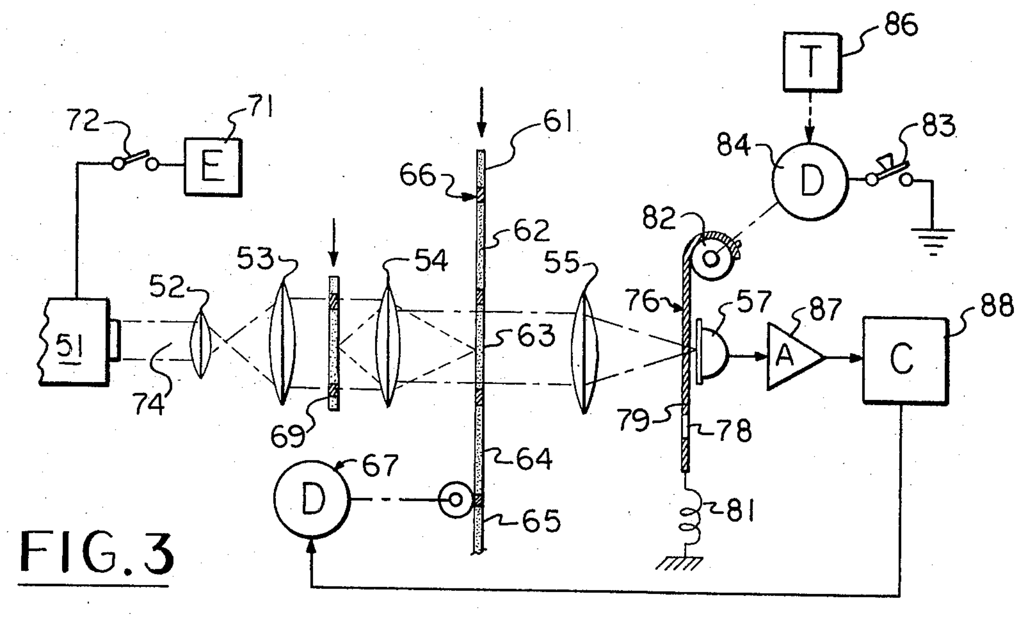
FIG. 3 is a diagrammatic illustration of a holographic search and identification system according to a preferred embodiment of the subject invention.
Figure 4:
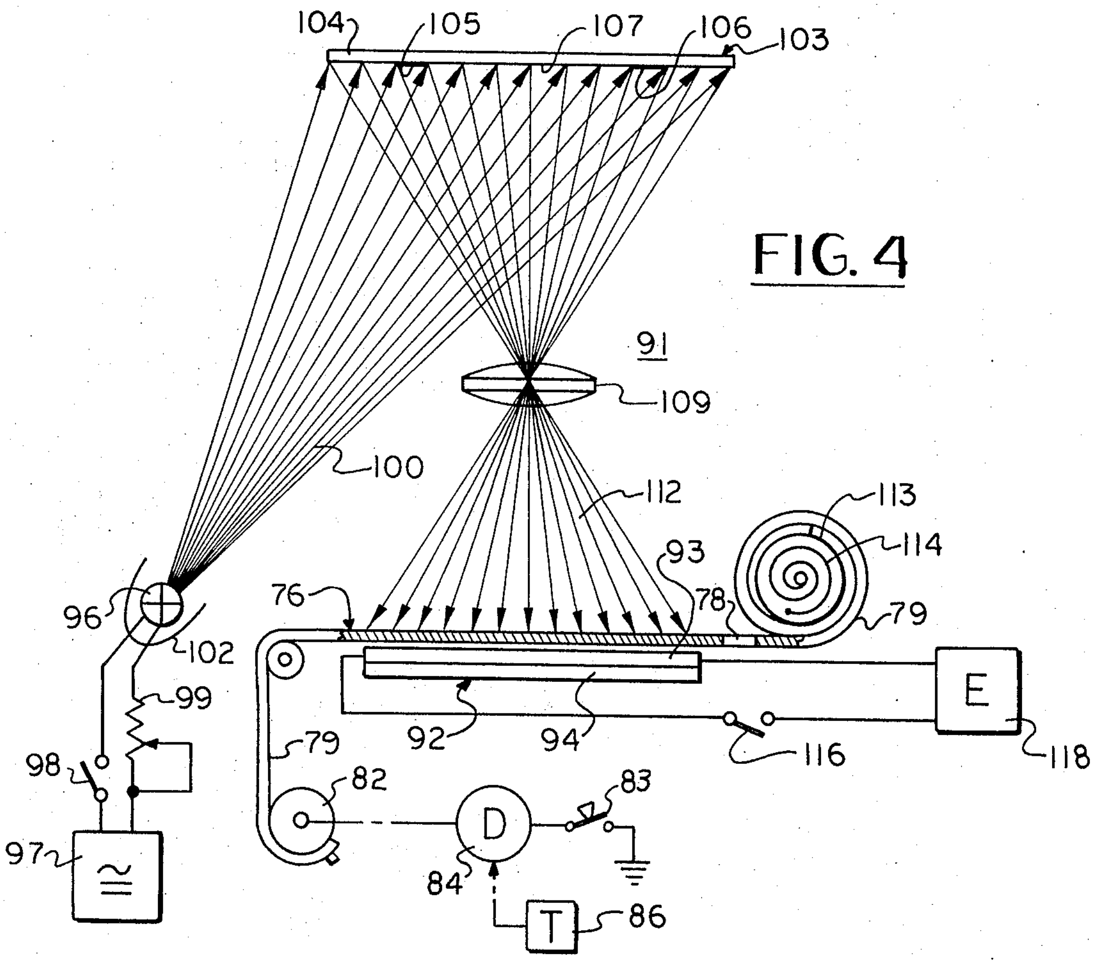
FIG. 4 is a diagrammatic illustration of a thermomagnetic imaging system in accordance with a further preferred embodiment of the subject invention.

The graph of FIG. 1 illustrates a typical current-versus-time plot of a photoelectric or photoconductive material that may be employed in the apparatus of FIGS. 3 to 5. Characteristics of this type have been realized in our laboratory with photocells having interdigitated electrodes and including photoconductive material sold by the Sylvania Corporation under the designation PC 102 containing CdS, CdSe, $CdCl_2$, and copper as dopant. The main constituents are CdS and CdSe, while $CdCl_2$ is a fluxing agent.

Curves 10 and 12 in FIG. 1 represent electric currents as a function of time. These currents were obtained by an exposure of the photocell to first and second light stimuli having first and second light intensities, with said first light intensity being higher than said second light intensity. By way of example, a characteristic of the type of curve 10 may be obtained in response to exposure to a light stimulus of about 10 foot-candles, while a characteristic of the type illustrated by curve 12 may be obtained by an exposure of the photocell by a light stimulus having an intensity of 1 foot-candle. Observing the curves 10 and 12, it will be noted that the rise time 13 associated with the curve 10 is much shorter than the rise time 14 associated with the curve 12. This, of course, means that the first rise time for the higher light intensities is shorter than the second rise time for the lower light intensity.

A dotted line 16 in FIG. 1 indicates the end of an exposure time period that was typically employed in prior-art systems. This exposure time extends well into the long term current regions of the curves 10 and 12.

The area 18 under the curve 10 (up to the dotted line 16) represents the electric energy provided in response to the first light intensity associated with the curve 10, while the area 19 under the curve 12 represents the electric energy provided in response to illumination by the second light intensity associated with the curve 12. In practice, it can be shown for long exposure times that the ratio of the areas 18 and 19 is significantly smaller than the ratio of the named first and second light intensities to which the photocell is exposed. In consequence, the contrast of response of the photoelectric system is considerably diminished relative to the contrast of the first and second light intensities to which the system is exposed.

In accordance with the subject invention, it has been found that the latter contrast of response is significantly enhanced if the exposure of the photoelectric system to the first and second stimuli is limited to a period of time shorter than the above mentioned second rise time. To illustrate this point, a dotted line 21 in FIG. 1 indicates the upper end of an exposure time period which is shorter than the second rise time 14. In that case, the area 23 under the curve 10 (up to the dotted line 21) and the area 24 under the curve 12 (also up to the dotted line 21) stand in a relationship to each other which corresponds more faithfully to the actual contrast between the named first and second light stimuli.

We have found and determined by experiment that this enhanced contrasting effect may be further improved by limiting the exposure time of the photocell to a period of time at least as short as the first rise time 13. This includes exposure periods shorter than the first rise time 13, as indicated by the phantom line 26 in FIG. 1.

Figure 2:
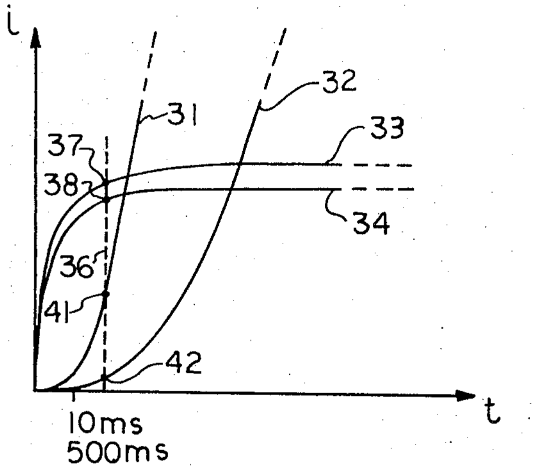

In preparing the current-versus-time plot of FIG. 2, two different time scales have been superimposed. More specifically, the curves 31 and 32 have been prepared with an oscilloscope at a time scale of 10 milliseconds per centimeters, and the curves 33 and 34 have been prepared with the same oscilloscope at a time scale of 500 milliseconds per centimeter. The curves 31 to 34 represent electric currents obtained from one and the same photocell; namely, a photocell of the type used also in the measurements represented by the plot of FIG. 1. Because of the different time scales, the curves 33 and 34 display the overall current characteristics of the photocell into the long term current range, while the curves 31 and 32 represent current characteristics of the photocell below the rise times for the represented low and high light intensities.

The curves 32 and 34 have been obtained by exposing the photocell to a uniform background illumination of 0.9 foot-candles. The curves 31 and 33 have been obtained by exposing the photocell to a bright spot of 14 foot-candles in the above mentioned background illumination of 0.9 foot-candles. The area of the illuminated background was about 157 times larger than the area of the bright spot.

A dotted line 36 in FIG. 2 indicates two times in the different times scales at which current measurements were taken. More specifically, the points 37 and 38 on the dotted line 36 represent currents occurring after the high-intensity and low-intensity rise times in response to exposure of the photocell to background illumination with and without the bright spot, respectively. On the other hand, points 41 and 42 on the dotted line 36 represent currents occurring at a time below the low-intensity and high-intensity rise times in response to exposure of the photocell to background illumination with and without the bright spot, respectively.

It will be noted at this juncture that not only different time scales, but also different current intensity scales have been employed in FIG. 2 to provide an adequate illustration of the depicted characteristics. Nevertheless, it is readily apparent from a comparison of the current levels represented by the points 37 and 38, on the one hand, and a comparison of the current levels represented by the points 41 and 42, on the other hand, that the contrast of response of the photocell between background illumination with and without the bright spot in terms of electric current input is relatively insignificant with photocell exposures exceeding the high and low intensity rise times. On the other hand, it is readily seen from the points 41 and 42 in FIG. 2 that the latter contrast of response is very significant for exposure periods shorter than the high-intensity rise time. In simple laboratory tests, the sensitivity of detection was easily improved one-hundred times by limiting the exposure of photocells to periods of time shorter than the high-intensity rise time (being the rise time for the bright spot with background illumination) as compared to photocell exposures above or exceeding the low-intensity rise time (being the rise time for the background illumination without bright spot).

Limiting the photocell exposure time to a period shorter than an occurring high-intensity rise time is generally the best mode of practicing the subject invention. This is particularly the case when the principles of the subject invention are employed for measurement or detection purposes. However, there are instances where the power output of the photocell generated during exposure periods shorter than the high-illumination rise time would be insufficient for a given purpose. Situation of this type may, for instance, arise if the principles of the subject invention are applied to photoelectric systems employed for imaging purposes. In the latter case, significant benefits according to the subject invention may still be obtained if the exposure period is limited to periods of time which are as least as short as an occurring low-intensity rise time. This may be seen from a comparison of portions of the curves 10 and 12 at and below the point 14 in FIG. 1. This fact has been experimentally verified.

An application of the principles of the subject invention is illustrated in FIG. 3. More specifically, FIG. 3 shows a holographic search and identification apparatus in accordance with a preferred embodiment of this invention.

Basically, the apparatus of FIG. 3 is of the type shown in U.S. Pat. Nos. 3,532,426 and 3,539,260 and in the literature and references cited therein. These U.S. Pat. Nos. 3,532,426 by C. Q. Lemmond, issued Oct. 6, 1970, and 3,539,260 by J. J. Burch, issued Nov. 10, 1970, are herewith incorporated by reference herein as to their disclosures. The principles of the subject invention may be applied to the systems shown in these latter patents as well as to other systems in which bright spot detection is useful.

The apparatus of FIG. 3 comprises a laser 51 such as a helium-neon gas laser, a beam diverging lens 52, a pair of collimating lenses 53 and 54, and a focusing lens 55. A photoelectric device 57, such as a photoconductive cell, is situated so that the first order image, or diffraction image immediately adjacent the optical axis of the system impinges thereon.

A series of holograms 61 to 65 of images or patterns to be searched for or identified are recorded in a conventional manner on a film strip 66. A conventional film strip drive 67 continuously or intermittently advances the film strip 66. An image or pattern 69 to be searched for or identified is inserted between the collimating lenses 53 and 54. By way of illustration, examples of images or patterns 69 include finger prints, target objects, various kinds of records, and various kinds of images.

The laser 51 is energized from a source of electrical energy 71 by closure of a switch 72. The laser 51 then emits collimated light 74 through the system. The holograms 61 to 65 serve as spatial filters for the input image 69. In case of a correspondence of an input image 69 with one of the holograms 61 to 65, a bright spot or light impulse appears in the background illumination projected onto the photocell 57 when the corresponding input image and hologram are aligned at opposite sides of the collimating lens 54.

In automated prior-art systems, it was difficult to distinguish reliably between an occurring bright spot on the one hand, and variations in the background illumination, on the other hand. According to the subject invention, this difficulty is overcome by restricting the exposure time of the photocell 57 to a period below the rise time of the photocell current applying to the background illumination, or preferably below the rise time of the photocell current applying to the bright spot illumination level.

In accordance with a preferred embodiment shown in FIG. 3, the latter illumination restriction is effected by the use of a shutter 76 of a type used in photographic apparatus. By way of example, the shutter 76 is of the focal-plane type, having a slit 78 in a curtain 79.

In the illustrated preferred embodiment of FIG. 3, the shutter 76 is positioned adjacent a photocell 57. It should, however, be understood that the shutter 76, or another type of shutter, may be positioned at another location in the system shown in FIG. 3, such as at the laser 51. Also, use of a shutter is not mandatory. Rather, the laser 51 may be pulsed so as to emit collimated light pulses corresponding in duration to the desired short exposure time according to the subject invention.

One end of the shutter curtain 79 is connected to a bias spring 81, while the other end of such curtain is connected to a roller 82. Upon closure of a switch 83, a conventional rotary drive 84 rotates the roller 82 so as to wind part of the shutter curtain 79 thereon against the bias of the spring 81. In this manner, the slit 78 is rapidly moved past the photocell 57 for an exposure thereof to the image provided by the input pattern 69 and one of the holograms 61 to 65. An adjustable timer 86 is coupled to the shutter drive 84 to control the exposure time of the photocell 57. The timer 86, as well as the drive 84 and the shutter release 83 may be conventional components as conventionally used in photographic or other equipment employing shutters.

The output signal of the photocell 57 is amplified by a conventional amplifier 87 which, if desired, may include a conventional threshold device (e.g. Schmitt trigger) so that the amplifier responds only to the higher current occurring upon detection of a bright spot, but not to the lower currents generated in response to general background illumination. Such a threshold device (not shown) may alternatively be incorporated in a control 88 which receives the output signal from the amplifier 87 and which, in turn, controls the film strip drive 67. By way of example, the control 88 may include a relay or similar control device which receives an energizing current through the amplifier 87 in response to the occurrence of a bright spot in the image received at the photocell 57, and which, in turn, interrupts energization of the drive 67 in response to the latter current.

Accordingly, the continuously or intermittently advancing film strip 66 is brought to a stop when an input image 69 and a corresponding hologram (e.g. 63) are in juxtaposition on opposite sides of the lens 54. The holograms 61 to 65 may be provided with appropriate legend (not shown) to inform the operator of the nature or identity of the located or identified input image. If desired, refinements of the type shown in the above mentioned U.S. Pat. No. 3,539,260, concerning alignment of the input and holographic images, may be employed in the practice of the subject invention.

A thermomagnetic recording or copying apparatus 91 employing principles of the subject invention is shown in FIG. 4.

The apparatus 91 of FIG. 4 has a composite thermomagnetic recording medium 92 comprising a photoconductive system 93 and a thermally responsive magnetic recording medium 94. Composite recording media of the type shown at 92 are, by way of example, disclosed in the following United States patents or patent applications, which are herewith incorporated by reference herein and which have been assigned to the subject assignee: U.S. Pat. application Ser. No. 029,583, filed Apr. 17, 1970 by Richard J. McClure (now U.S. Pat. No. 3,717,459, issued Feb. 20, 1973, and Pat. No. 3,778,145, issued Dec. 11, 1973) and U.S. Pat. application Ser. No. 029,584, filed Apr. 17, 1970, by Sherman W. Duck, Frederick J. Jeffers and James U. Lemke (now U.S. Pat. No. 3,778,145, issued Feb. 20, 1973). Reference may also be had to British Patent Specification No. 1,275,663, issued to the present assignee.

In preferred embodiments disclosed in the latter three patents, a photoconductive system is employed to generate a pattern of spatially distributed electrical currents having, for instance, first and second current intensitites in response to first and second light intensities of an input image. These patents also disclose techniques and means for providing with the aid of the latter electrical currents a pattern of magnetic gradients having first and second intensitites corresponding to the first and second current intensities. For instance, the electrical currents may be employed for generating a pattern of thermal gradients having, for example, first and second thermal intensities corresponding to the above mentioned first and second current intensities. That thermal pattern is either generated in or applied to means for providing, and for retaining, a pattern of erasable magnetic gradients having first and second intensities corresponding to the first and second thermal intensities.

By way of example and in accordance with the teachings of the latter patents, the photoelectric system 93 may include a layer of photoconductive material, such as cadmium sulfide, cadmium selenide, alloys of cadmium sulfide or cadmium selenide, and the like. In accordance with the teachings of the British patent, the photoconductive layer may be sandwiched between two sheet electrodes, at least one of which is light transparent. In accordance with the more preferred teaching of the latter U.S. patent, an interdigitated electrode structure may be employed for sending electrical currents through the photoconductive layer.

The magnetic recording layer 94 may include a thermally responsive magnetizable or magnetized recording medium. By way of example, suitable recording media include low-Curie point materials or similar media which preferably have a Curie point or other magnetic transition point at temperatures preferably below 200°C and which can be selectively demagnetized or thermoremanently magnetized at such temperatures by or with the aid of thermal gradients. Suitable thermally responsive magnetic recording media include, by way of example and not by way of limitation, ferromagnetic $CrO_2$ and MnAs films. These and other materials are more fully described in the following United States patents which are herewith incorporated by reference herein: U.S. Pat. No. 3,541,577, by James U. Lemke, issued Nov. 17, 1970, and U.S. Pat. No. 3,613,102, by Nelson B. Daly et al., issued Oct. 12, 1971. Reference may also be had to British Patent Specification No. 1,139,232 issued to E. I. duPont de Nemours and Company.

According to FIG. 4, an electric light source 96, such as a high-intensity incandescent or gas discharge lamp, is energized from an electric power source 97 upon closure of a switch 98. A variable resistor 99 may be employed to vary the intensity of the light radiation 100 emitted by the source 96. A reflector 102 is associated with the source 96 to direct the light 100 toward an information record 103. By way of example, the record 103 may comprise a sheet of white paper 104 which has information or image elements 105 and 106 printed or otherwise located thereon. By way of example, the elements 105 and 106 may be part of an image which is to be magnetically recorded on the medium 94.

For explanatory purposes we may assume that the image element 105 is darker than the image element 106 and that both of these image elements are on a white background 107. The luminous reflection imaged by the lens system 109 onto or toward the recording medium 92 has thus light stimuli of different intensities. For present purposes we may distinguish between a high first intensity applying to light reflected from the white background 107, and a low second intensity applying to light reflected by the darker image element 105. In the case of the record 103, there also exists an intermediate intensity applying to light reflected by the lighter image element 106.

Typical photoconductive systems of the type employed in prior-art imaging or copying apparatus have a reduced contrast of response as compared to the contrast occurring in the input or reflected image. As indicated above, the reason for this is primarily seen in the 0.8 to 0.6 power law relationship between the conductivity of the photoconductive material and the light input intensity. Beneficial contrast enhancements are, however, also provided in accordance with the subject invention in cases where there exists a linear relationship between conductivity and illumination intensity.

In accordance with the subject invention, the time period of exposure of the photoconductive layer 93 to the reflected image 112 is limited to a period of time shorter than the rise time of the above mentioned second light intensity. If more than two different light intensities occur in the reflected image 112, then the exposure time is made shorter than the rise time of the lowest light intensity that is desired to be faithfully recorded. In accordance with a preferred embodiment of the invention, the exposure duration is restricted to a time period being at least as short as the rise time for the above mentioned higher first light intensity.

The latter measures concerning the exposure duration apply not only when the entire photoconductive layer is exposed at the same time, but also when successive portions of the layer are exposed sequentially. In that case, the exposure duration of each exposed portion or element of the photoconductive layer is limited in accordance with the subject invention.

In the embodiment shown in FIG. 3, this is accomplished with a shutter 76 of the above mentioned type having a slit 78 in a curtain 79. A first end of the curtain 79 is attached to the previously disclosed roller 82 which is rotated by a shutter drive 84 upon actuation of a shutter release 83. The exposure duration may be set by an adjustable exposure timer 86 as before. Another end portion of the shutter curtain 79 is wound on a roller 113 which is biased by a spring 114.

Upon actuation of the shutter release 83, the slit 87 is drawn from the right to the left, as seen in FIG. 4, so that successive portions of the photoconductor layer 93 are exposed to the reflected image 112.

Preparatory to such exposure, a switch 116 is closed, connecting the photoconductive system 93 to an electric power source 118, for the establishment of electrical current gradients and corresponding thermal gradients in response to various light intensities in the reflected image 112. Also, the thermomagnetic recording layer 94 may be premagnetized in a conventional manner prior to actuation of the shutter release 83. A preferred prior-art magnetization technique includes the recordation of a magnetic line pattern on the layer 94.

As the exposure slit 78 is drawn across the photoconductive layer 93, thermal gradients generated in response to light intensities in the reflected image 112 cause localized heating of the thermomagnetic recording layer 95 to the Curie point or other transition temperature at which the premagnetization is thermally erased.

In consequence, and as disclosed in the above mentioned Duck, Jeffers, Lemke and McClure patent applications or patents, a magnetic image of the reflected image 112 is thus generated. This magnetic image may be magnetically read out or may be printed out on paper and other sheet stock with the aid of a conventional magnetic toner or printout agent.

Because of the contrast enhancement effected by operation of the subject invention, areas of the magnetic recording layer 94 corresponding to the darkest image areas remain virtually completely magnetized so as to attract sufficient toner for a black printout. On the other hand, areas of the magnetic recording layer 94 corresponding to the lightest image areas are demagnetized so as to attract substantially no toner that could significantly darken the printout in those areas.

Between these two extremes, there will be gradations of demagnetization which faithfully correspond to different light intensity levels in their reflected image 112 and which lead to a corresponding attraction of magnetic toner for a high-fidelity printout of the different intensity levels.

Use of a slit shutter is not an indispensable feature in the embodiment shown in FIG. 4. Rather, as indicated in FIG. 5, a rotary shutter 121 may be employed at the light source 96. The rotary shutter 121 has an aperture 122 and is mounted on a shaft 123.

The shutter 121 normally obscures the light from the source 96. However, upon rotation of the shaft 123 by a conventional drive (not shown) the aperture 122 is moved adjacent to the light source 96 and the light 100 is permitted to flood the record 103 as shown in FIG. 4. A reflected light image 112 is then generated and is imaged by the lens system 109 onto the photoconductor layer 93. Rotation of the shutter 121 is thereupon continued so that the exposure of the photoconductor layer 93 is limited in duration to a period of time shorter than the above mentioned rise time applying to the lower light intensities, or preferably as short as the above mentioned rise time relating to the higher light intensities.

The principles and features of the subject invention may advantageously be combined with an exposure of the photoconductor layer 93 along a narrow swept exposure band as taught in the above mentioned Duck, Jeffers, and Lemke patent application or patent.

Moreover, the utility of the thermal gradients provided in accordance with the subject invention is not limited to magnetic imaging or recording. Rather, the generated patterns of thermal gradients may be employed to provide records other than magnetic records in thermographic systems in general. In these cases, as well as in the thermomagnetic embodiments, a record having first and second intensities corresponding to first and second thermal intensities is provided with the aid of the above mentioned thermal gradients.

Further modifications within the spirit and scope of the subject invention will become apparent or suggest themselves to those skilled in the art on the basis of the subject disclosure.

We claim:

1. In a method of enhancing contrast of response of a photoelectric process to first and second light stimuli having first and second light intensities, respectively, with said first light intensity being higher than said second light intensity, the improvement comprising in combination the steps of:

providing a photoelectric system having a first rise time in response to said first intensity and a second rise time in response to said second intensity, said first rise time being shorter than said second rise time;

exposing said photoelectric system to said first and second stimuli for a period of time shorter than said second rise time; and deriving an electric signal from said photoelectric system during said period of time.

2. A method as claimed in claim 1, wherein:

said period of time is made at least as short as said first rise time.

3. In a method of detecting a bright spot in an illuminated background, the improvement comprising in combination the steps of:

providing a photoelectric system having a first rise time in response to said bright spot and a second rise time in response to said illuminated background, said first rise time being shorter than said second rise time;

exposing said photoelectric system to said bright spot and to said illuminated background for a period of time shorter than said second rise time; and deriving an electric signal indicative of said bright spot from said photoelectric system.

4. A method as claimed in claim 3, wherein:

said period of time is made at least as short as said first rise time.

5. In a method of enhancing contrast of response of a photoelectric process to spatially distributed first and second light stimuli having first and second light intensities, respectively, with said first light intensity being higher than said second light intensity, the improvement comprising in combination the steps of:

providing a photoelectric system having a first rise time in response to said first intensity and a second rise time in response to said second intensity, said first rise time being shorter than said second rise time;

exposing said photoelectric system to said spatially distributed first and second stimuli for a first period of time shorter than said second rise time; and generating with said photoelectric system during said first period of time a pattern of spatially distributed electrical currents having first and second current intensities in response to said first and second light intensities, with the contrast between said first and second current intensities being enhanced relative to a contrast attainable by an exposure of said photoelectric system to said spatially distributed first and second intensities for a second period of time longer than said first period of time.

6. A method as claimed in claim 5, wherein:

said first period of time is made at least as short as said first rise time.

7. In a method of enhancing contrast of response of a photoelectric process to spatially distributed first and second light stimuli having first and second light intensities, respectively, with said first light intensity being higher than said second light intensity, the improvement comprising in combination the steps of:

providing a photoelectric system having a first rise time in response to said first intensity and a second rise time in response to said second intensity, said first rise time being shorter than said second rise time;

exposing successive portions of said photoelectric system to said spatially distributed first and second stimuli, each portion of said photoelectric system so exposed being exposed for a first period of time shorter than said second rise time; and generating with said photoelectric system a pattern of spatially distributed currents having first and second current intensities in response to said first and second light intensities, with the contrast between said first and second current intensities being enhanced relative to a contrast attainable by an exposure of portions of said photoelectric system to said spatially distributed first and second intensitites for a second period of time longer than said first period of time.

8. A method as claimed in claim 7, wherein:

said first period of time is made at least as short as said first rise time.

9. In apparatus for providing enhanced contrast of response to first and second light stimuli having first and second light intensities, respectively, with said first light intensity being higher than said second light intensity, the improvement comprising in combination:

a photoelectric system having a first rise time in response to said first intensity and a second rise time in response to said second intensity, said first rise time being shorter than said second rise time;

means for exposing said photoelectric system to said first and second stimuli for a period of time shorter than said second rise time; and means connected to said photoelectric system for deriving an electric signal from said photoelectric system during said period of time.

10. An apparatus as claimed in claim 9, wherein:

said exposing means include means for exposing said photoelectric system to said first and second stimuli for a period of time being at least as short as said first rise time.

11. In apparatus for detecting a bright spot in an illuminated background, the improvement comprising in combination:

a photoelectric system having a first rise time in response to said bright spot and a second rise time in response to said illuminated background, said first rise time being shorter than said second rise time;

means for exposing said photoelectric system to said bright spot and to said illuminated background for a period of time shorter than said second rise time; and means connected to said photoelectric system for deriving an electric signal indicative of said bright spot from said photoelectric system.

12. An apparatus as claimed in claim 11, wherein:

said exposing means include means for exposing said photoelectric system to said bright spot and to said illuminated background for a period of time being at least as short as said first rise time.

13. In apparatus for providing a pattern of spatially distributed currents in response to spatially distributed first and second light stimuli having first and second light intensities, respectively, with said first light intensity being higher than said second light intensity, the improvement comprising in combination:

a photoelectric system having a first rise time in response to said first intensity and a second rise time in response to said second intensity, said first rise time being shorter than said second rise time;

means for exposing said photoelectric system to said spatially distributed first and second stimuli for a first period of time shorter than said second rise time; and means connected to said photoelectric system for generating during said first period of time a pattern of spatially distributed electrical currents having first and second current intensities in response to said first and second light intensities, whereby the contrast between said first and second current intensities is enhanced relative to a contrast attainable by an exposure of said photoelectric system to said spatially distributed first and second intensities for a second period of time longer than said first period of time.

14. An apparatus as claimed in claim 13, wherein:

said exposing means include means for exposing said photoelectric system to said spatially distributed first and second stimuli for a period of time being at least as short as said first rise time.

15. In apparatus for providing a pattern of spatially distributed currents in response to spatially distributed first and second light stimuli having first and second light intensities, respectively, with said first light intensity being higher than said second light intensity, the improvement comprising in combination:

a photoelectric system having a first rise time in response to said first intensity and a second rise time in response to said second intensity, said first rise time being shorter than said second rise time;

means for exposing successive portions of said photoelectric system to said spatially distributed first and second stimuli, including means for limiting the exposure of each of said portions of said photoelectric system to a first period of time shorter than said second rise time; and means connected to said photoelectric system for generating during said first period of time a pattern of spatially distributed electrical currents having first and second current intensities in reponse to said first and second light intensities, whereby the contrast between said first and second current intensities is enhanced relative to a contrast attainable by an exposure of said photoelectric system to said spatially distributed first and second intensities for a second period of time longer than said first period of time.

16. An apparatus as claimed in claim 15, wherein:

said exposing means include means for limiting the exposure of each of said portions of said photoelectric system to a period of time being at least as short as said first rise time.

* * * * *